United States Patent
Tsuzuki (10) Patent No.: US 12,122,169 B2
(45) Date of Patent: Oct. 22, 2024

(54) PRINTER DEVICE INK RIBBON SAVING DETERMINATION

(71) Applicant: TOSHIBA TEC KABUSHIKI KAISHA, Tokyo (JP)

(72) Inventor: Seiji Tsuzuki, Kawaguchi Saitama (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 17/861,283

(22) Filed: Jul. 11, 2022

(65) Prior Publication Data
US 2023/0150272 A1 May 18, 2023

(30) Foreign Application Priority Data

Nov. 17, 2021 (JP) .................. 2021-186904

(51) Int. Cl.
| | | |
|---|---|---|
| B41J 2/325 | (2006.01) | |
| B41J 2/33 | (2006.01) | |
| B41J 17/04 | (2006.01) | |
| B41J 17/12 | (2006.01) | |
| B41J 25/10 | (2006.01) | |
| B41J 33/14 | (2006.01) | |

(Continued)

(52) U.S. Cl.
CPC .............. *B41J 2/325* (2013.01); *B41J 2/33* (2013.01); *B41J 17/04* (2013.01); *B41J 17/12* (2013.01); *B41J 25/10* (2013.01); *B41J 33/14* (2013.01); *B41J 33/54* (2013.01); *B41J 2/32* (2013.01); *B41J 3/4075* (2013.01); *B41J 3/46* (2013.01); *B41J 11/425* (2013.01); *B41J 33/388* (2013.01); *B41J 35/38* (2013.01)

(58) Field of Classification Search
CPC ..... B41J 2/325; B41J 2/33; B41J 17/04; B41J 17/12; B41J 25/10; B41J 33/14; B41J 33/54; B41J 2/32; B41J 3/4075; B41J 3/46; B41J 11/425; B41J 33/388; B41J 35/38

See application file for complete search history.

(56) References Cited

U.S. PATENT DOCUMENTS

| | | | |
|---|---|---|---|
| 2014/0293336 A1* | 10/2014 | Endo .................. | B41J 3/4075 358/1.15 |
| 2019/0193416 A1* | 6/2019 | Katsumata ............ | B41J 3/4075 |
| 2019/0299646 A1* | 10/2019 | Horade .................. | B41J 2/1752 |

FOREIGN PATENT DOCUMENTS

JP 2004-42267 2/2004

OTHER PUBLICATIONS

Extended European Search Report for European Patent Application No. 22194465.5 dated Mar. 16, 2023.

\* cited by examiner

*Primary Examiner* — Henok D Legesse
(74) *Attorney, Agent, or Firm* — Amin, Turocy & Watson, LLP (57) ABSTRACT

According to one embodiment, a thermal heat transfer printer (printer device) includes a printing data look-ahead unit configured to look ahead a data printing position if printing is performed; a head position control unit configured to cause a thermal head, an ink ribbon, and printing paper to be in a contact state or a non-contact state based on a look-ahead result of the printing data look-ahead unit; an ink ribbon saved amount calculation unit configured to calculate a saved amount of the ink ribbon based on a conveyed amount of the printing paper in the non-contact state; and an ink ribbon saved amount display unit configured to display the saved amount calculated by the ink ribbon saved amount calculation unit.

20 Claims, 6 Drawing Sheets

(51) Int. Cl.
*B41J 33/54* (2006.01)
*B41J 2/32* (2006.01)
*B41J 3/407* (2006.01)
*B41J 3/46* (2006.01)
*B41J 11/42* (2006.01)
*B41J 33/388* (2006.01)
*B41J 35/38* (2006.01)

PRINTER DEVICE INK RIBBON SAVING DETERMINATION

CROSS-REFERENCE TO RELATED APPLICATION

This application is based upon and claims the benefit of priority from Japanese Patent Application No. 2021-186904, filed on Nov. 17, 2021, the entire contents of which are incorporated herein by reference.

FIELD

Embodiments described herein relate generally to a printer device and methods related thereto.

BACKGROUND

In a thermal transfer printer, printing is performed by bringing an ink ribbon into contact with printing paper by a thermal head. Also, if there is no printing data, by causing the thermal head, the ink ribbon, and the printing paper to be in a non-contact state, the running of the ink ribbon is paused to save the ink ribbon.

In such a printer device, the consumption amount of the ink ribbon is displayed, but the saved amount of the ink ribbon cannot be known. In order for the user to realize the effect of saving the ink ribbon, it is desirable to visualize the saved amount of the ink ribbon.

DETAILED DESCRIPTION

An aspect of the embodiment is to provide a printer device that can display a saved amount of an ink ribbon.

In general, according to one embodiment, a printer device includes a printing data look-ahead unit, a head position control unit, an ink ribbon saved amount calculation unit, and an ink ribbon saved amount display unit. The printing data look-ahead unit looks ahead a data printing position if printing is performed. The head position control unit causes a thermal head, an ink ribbon, and printing paper to be in a contact state or a non-contact state based on a look-ahead result of the printing data look-ahead unit. The ink ribbon saved amount calculation unit calculates a saved amount of the ink ribbon based on a conveyed amount of the printing paper in the non-contact state. The ink ribbon saved amount display unit displays the saved amount calculated by the ink ribbon saved amount calculation unit.

Hereinafter, an embodiment of a label printer according to an exemplary embodiment is described in detail with reference to the accompanying drawings.

Overall Configuration of Label Printer

Figure 1:
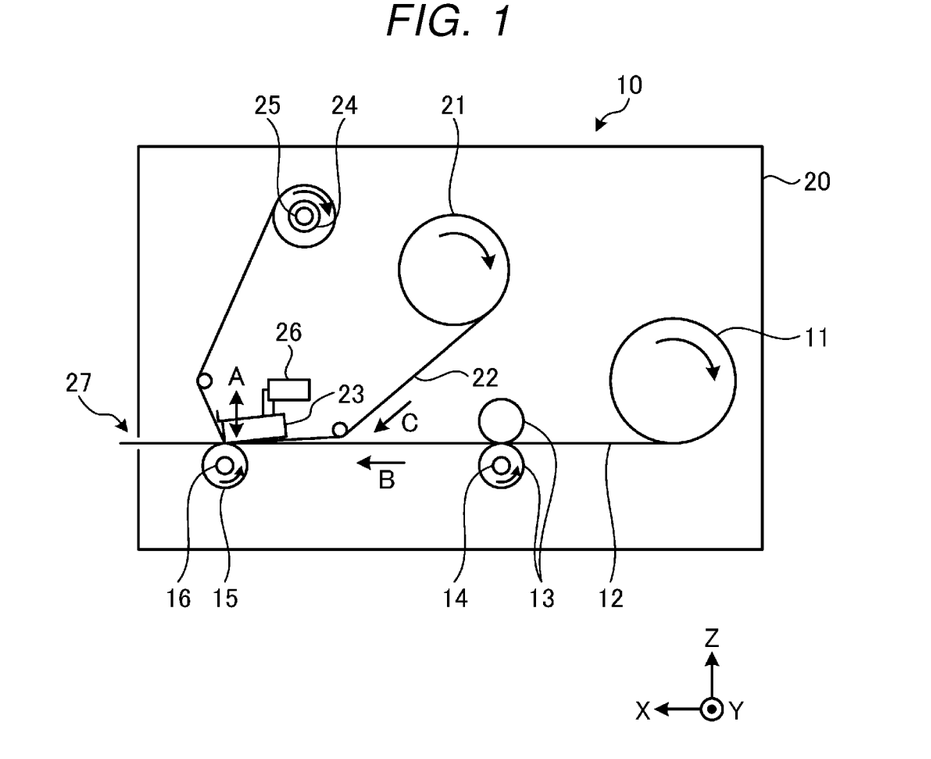
FIG. 1 is a diagram illustrating an example of a schematic structure of a thermal heat transfer printer according to an embodiment.

By using FIG. 1, a schematic configuration of a thermal heat transfer printer 10 according to a present embodiment is described. FIG. 1 is a diagram illustrating an example of a schematic structure of the thermal heat transfer printer 10 according to the embodiment. In addition, the thermal heat transfer printer 10 is an example of a printer device according to the embodiment.

The thermal heat transfer printer 10 performs printing while extracting a printing paper 12 from a roll paper 11 obtained by winding the printing paper 12 in a roll shape.

The thermal heat transfer printer 10 includes conveyance rollers 13, a platen roller 15, and a thermal head 23 inside a housing 20.

The conveyance rollers 13 are formed with a pair of rollers that are in contact with each other, and one of the conveyance rollers 13 is rotationally driven by a driving motor 14 counterclockwise. The conveyance rollers 13 convey the printing paper 12 extracted from the roll paper 11 toward an ejection port 27 along an arrow B.

The platen roller 15 is rotationally driven by a driving motor 16 counterclockwise. The platen roller 15 conveys the printing paper 12 sandwiched between the platen roller 15 and the thermal head 23 toward the ejection port 27 along the arrow B.

In addition, the platen roller 15 conveys the printing paper 12 if the thermal head 23 and the platen roller 15 are in contact with each other. Meanwhile, the conveyance rollers 13 convey the printing paper 12 if the thermal head 23 and the platen roller 15 are not in contact with each other.

The thermal head 23 has a structure in which a plurality of heating elements are arranged and performs printing on the printing paper 12 sandwiched between the thermal head 23 and the platen roller 15 by causing the heating elements corresponding to the printing pattern to generate heat. In addition, the thermal head 23 moves up and down (a Z axis direction in FIG. 1) by an action of a solenoid 26. Accordingly, a state in which the thermal head 23 and the platen roller 15 are in contact with each other and a state in which the thermal head 23 are the platen roller 15 are not in contact with each other can be switched.

In addition, an ink ribbon 22 is inserted between the thermal head 23 and the platen roller 15. The ink ribbon 22 forms a ribbon roll 21 wound in an unused state. The ink ribbon 22 is wound about a winding axis 24 rotationally driven by a driving motor 25. The ink with which the ink ribbon 22 is coated is transferred to the printing paper 12 by the heated thermal head 23.

The printing paper 12 on which printing is completed is discharged from the ejection port 27. Also, the printing paper 12 on which printing is completed is cut by a cutter (not illustrated in FIG. 1) included in the thermal heat transfer printer 10.

Vertical Movement Mechanism of Thermal Head

Figure 2:
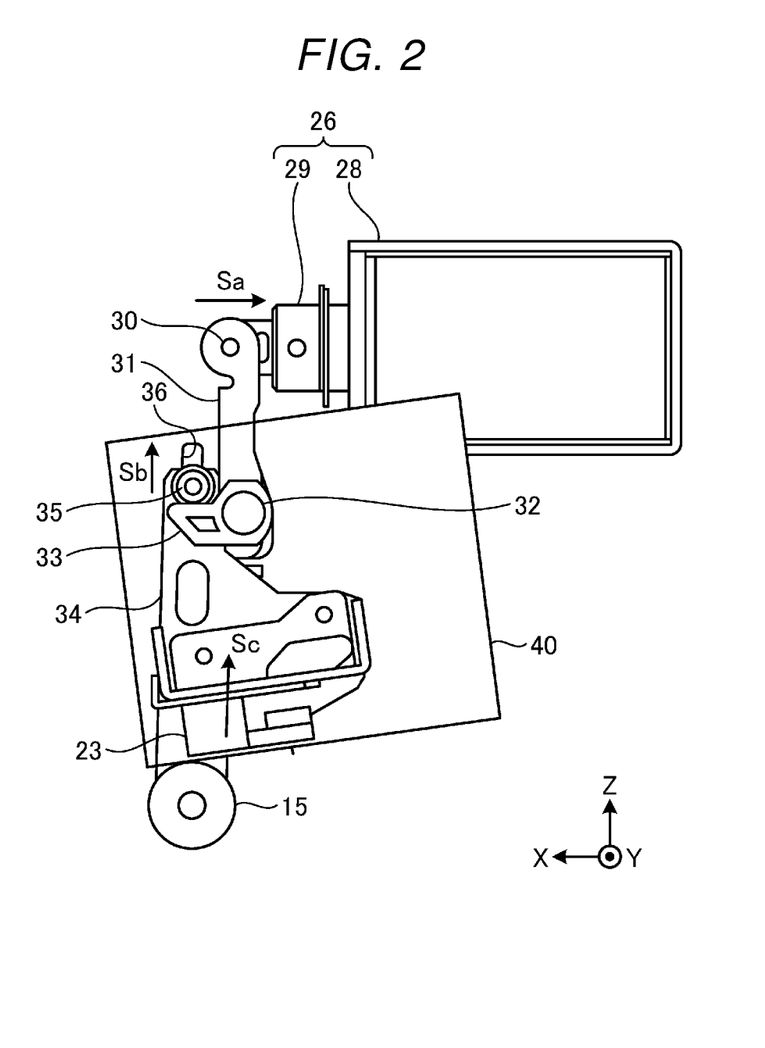
FIG. 2 is a diagram illustrating a structure of raising and lowering a thermal head in the thermal heat transfer printer.

By using FIG. 2, a structure in which the thermal heat transfer printer 10 raises and lowers the thermal head 23 is described. FIG. 2 is a diagram illustrating the structure of raising and lowering the thermal head 23 in the thermal heat transfer printer 10.

The solenoid 26 includes a frame 28 and a plunger 29.

The frame 28 includes a coil and a fixed iron core inside thereof.

The plunger 29 is also referred to as a moveable iron core. If electricity is conducted to a coil inside the frame 28 to generate a magnetic field, the plunger 29 is attracted to the fixed iron core of the frame 28.

A link member 31 that can rotate around a first rotation shaft 30 is installed at a tip of the plunger 29. The link member 31 is rotatably pivotally supported by a second rotation shaft 32 together with a cam 33.

The cam 33 is in contact with a pin 35 inserted to a gap 36. The pin 35 is fixed to a frame member 34 to which the thermal head 23 is attached and can move along the gap 36. In addition, the thermal head 23, the frame member 34, the pin 35, and the cam 33 are included in a housing 40.

If electricity is conducted to the solenoid 26, the plunger 29 is drawn to a negative side of an X axis and moves in a direction of an arrow Sa. Also, in conjunction with the movement of the plunger 29, the link member 31 rotates clockwise around the second rotation shaft 32.

According to the clockwise rotation of the link member 31, the cam 33 also clockwise rotates around the second rotation shaft 32. At this point, the cam 33 pushes up the pin 35 to the positive side of a Z axis along the gap 36, that is, in a direction of an arrow Sb.

Also, according to the movement of the pin 35, the frame member 34 to which the pin 35 is fixed is pushed up to the positive side of the Z axis. Accordingly, the thermal head 23 is pushed up in a direction of an arrow Sc so that a state in which the head is raised is obtained, and thus is separated from the platen roller 15.

If the electricity to the solenoid 26 is released, the tip of the plunger 29 moves in an opposite direction to the arrow Sa. Accordingly, the link member 31 counterclockwise rotates around the second rotation shaft 32.

According to the counterclockwise rotation of the link member 31, the cam 33 also counterclockwise rotates around the second rotation shaft 32. At this time, while maintaining the state of being in contact with the cam 33, the pin 35 moves to the negative side of the Z axis along the gap 36, which is in an opposite direction to the arrow Sb.

Also, according to the movement of the pin 35, the frame member 34 to which the pin 35 is fixed moves to the negative side of the Z axis. Accordingly, the thermal head 23 moves in an opposite direction to the arrow Sc to become in a state in which the thermal head 23 is lowered, and thus comes into contact with the platen roller 15.

Hardware Configuration of Thermal Heat Transfer Printer

Figure 3:
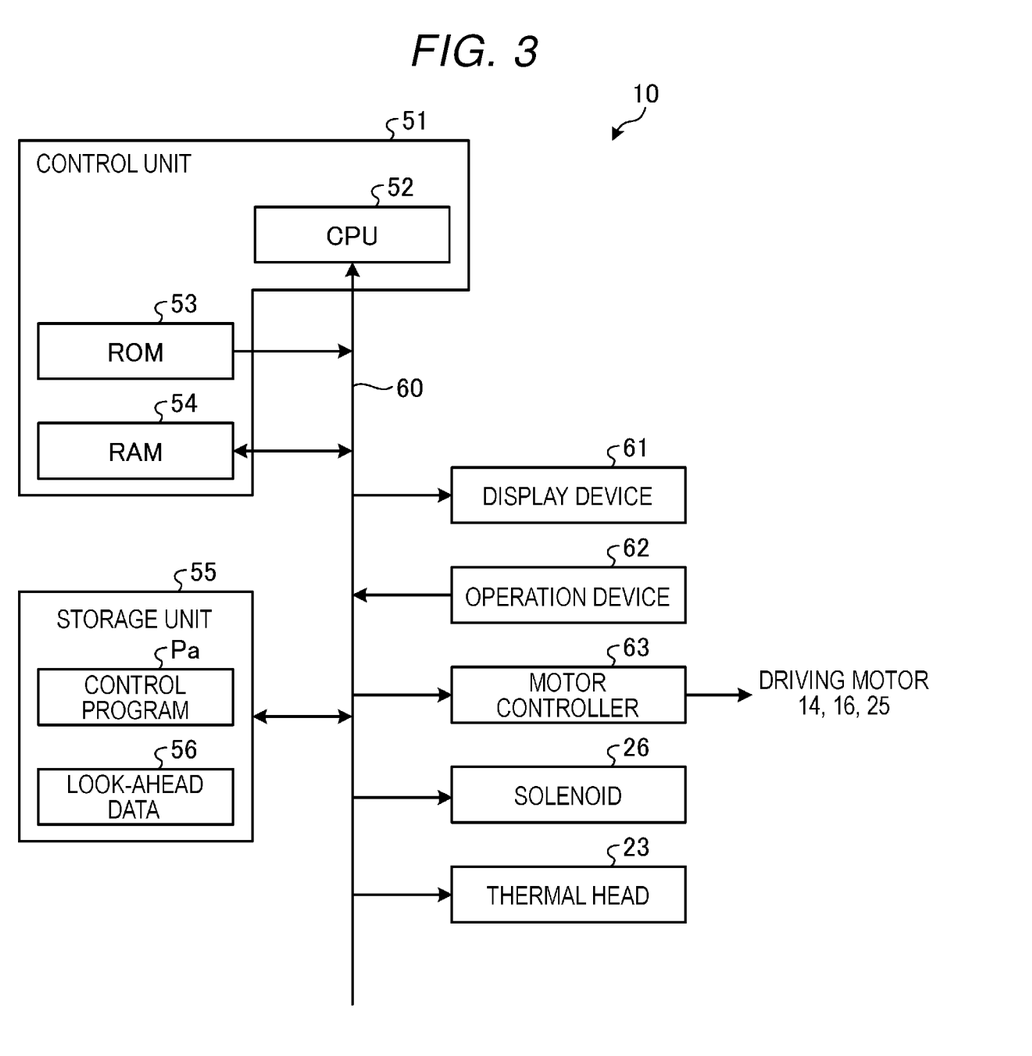
FIG. 3 is a hardware block diagram illustrating an example of a hardware configuration of the thermal heat transfer printer.

By using FIG. 3, the hardware configuration of the thermal heat transfer printer 10 is described. FIG. 3 is a hardware block diagram illustrating an example of the hardware configuration of the thermal heat transfer printer 10.

The thermal heat transfer printer 10 includes a control unit 51 for controlling each unit. The control unit 51 includes a central processing unit (CPU) 52, a read only memory (ROM) 53, and a random access memory (RAM) 54. The CPU 52 is connected to the ROM 53 and the RAM 54 via an internal bus 60 such as an address bus and a data bus. The CPU 52 loads various programs stored in the ROM 53 or a storage unit 55 onto the RAM 54. The CPU 52 controls the thermal heat transfer printer 10 by being operated according to the various programs loaded onto the RAM 54. That is, the control unit 51 has a configuration of a general computer.

The control unit 51 is connected to the storage unit 55 and peripheral devices via the internal bus 60. The peripheral devices are a display device 61, an operation device 62, a motor controller 63, the solenoid 26, and the thermal head 23.

The storage unit 55 is a storage device such as a hard disk drive (HDD) or a solid state drive (SSD). In addition, the storage unit 55 may be a non-volatile memory such as a flash memory in which the storage information is stored even if the power is turned off. The storage unit 55 stores a control program Pa and look-ahead data 56.

The control program Pa is a program that controls overall operations of the thermal heat transfer printer 10.

Considering the position of the thermal head 23, the look-ahead data 56 stores a result for looking ahead the position where printing data is actually present. In addition, the look-ahead data 56 is specifically described below (see FIG. 5).

The display device 61 displays various kinds of screen information according to the thermal heat transfer printer 10, which is generated by the control unit 51. The display device 61 is, for example, a liquid crystal panel or an organic EL panel.

The operation device 62 is a device such as a touch panel or a physical switch that acquires various operation instructions according to the thermal heat transfer printer 10. The operation device 62 outputs the acquired operation instruction to the control unit 51.

The motor controller 63 independently controls rotation states with respect to the driving motor 14 that drives the conveyance rollers 13, the driving motor 16 that drives the platen roller 15, and the driving motor 25 that rotationally drives the winding axis 24.

The solenoid 26 and the thermal head 23 are as described above.

Functional Configuration of Thermal Heat Transfer Printer

Figure 4:
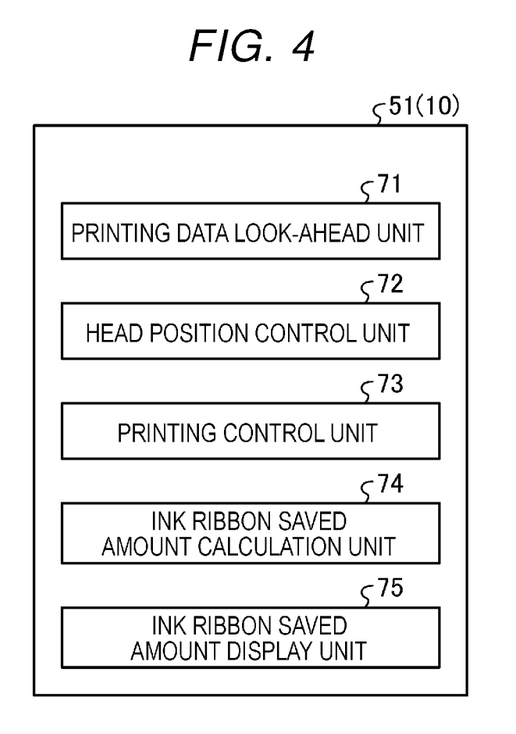
FIG. 4 is a functional block diagram illustrating an example of a functional configuration of the thermal heat transfer printer.

By using FIG. 4, the functional configuration of the thermal heat transfer printer 10 is described. FIG. 4 is a functional block diagram illustrating an example of the functional configuration of the thermal heat transfer printer 10.

The control unit 51 of the thermal heat transfer printer 10 realizes a printing data look-ahead unit 71, a head position control unit 72, a printing control unit 73, an ink ribbon saved amount calculation unit 74, and an ink ribbon saved amount display unit 75 illustrated in FIG. 4 as functional units by executing the control program Pa loaded onto the RAM 54.

If the printing is performed, the printing data look-ahead unit 71 looks ahead a data printing position.

The head position control unit 72 causes the thermal head 23, the ink ribbon 22, and the printing paper 12 to be in a contact state or a non-contact state based on the look-ahead result of the printing data look-ahead unit 71.

The printing control unit 73 controls the printing operation of the thermal heat transfer printer 10. In addition, the printing control unit 73 switches the state of the ink ribbon 22 between the conveyed state and the stopped state.

The ink ribbon saved amount calculation unit 74 calculates the saved amount of the ink ribbon 22 based on the conveyed amount of the printing paper 12 if the thermal head 23, the ink ribbon 22, and the printing paper 12 are in the non-contact state. Specifically, the ink ribbon saved amount calculation unit 74 calculates the number of times of rotations of the driving motor 14 that drives the conveyance rollers 13 during a period of time if the thermal head 23 is raised. Accordingly, the conveyed amount of the printing paper 12 during the period of time if the thermal head 23 is raised is calculated. Also, since it can be regarded that the conveyed amount of the printing paper 12 during the period of time if the thermal head 23 is raised and the conveyed amount of the ink ribbon 22 during the corresponding period of time are almost the same, the ink ribbon saved amount calculation unit 74 calculates the saved amount of the ink ribbon 22.

In addition, the ink ribbon saved amount calculation unit 74 accumulates a saved amount of the ink ribbon 22 since the ribbon roll 21 obtained by winding the ink ribbon 22 is replaced with a new product.

The ink ribbon saved amount display unit 75 displays the saved amount of the ink ribbon 22 that is calculated by the ink ribbon saved amount calculation unit 74. In addition, the ink ribbon saved amount display unit 75 displays the saved amount of the ink ribbon 22 since the ribbon roll 21 is replaced with a new product.

Look-Ahead Method of Printing Data

Figure 5:
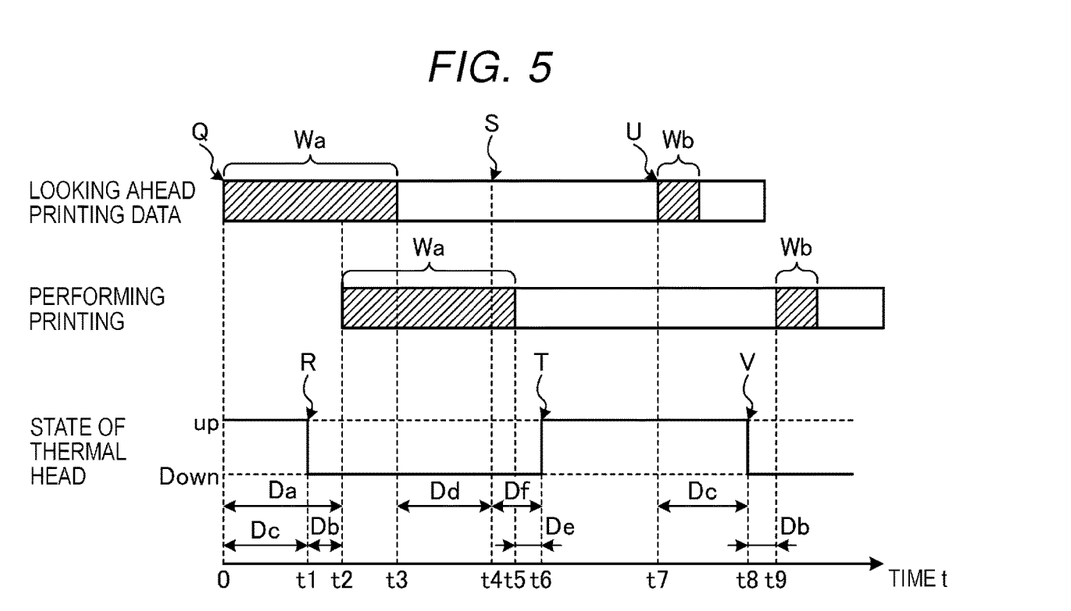
FIG. 5 is a diagram illustrating a look-ahead method of printing data which is performed by the thermal heat transfer printer.

By using FIG. 5, the look-ahead method of the printing data performed by the thermal heat transfer printer 10 is described. FIG. 5 is a diagram illustrating the look-ahead method of the printing data performed by the thermal heat transfer printer 10.

A horizontal axis of FIG. 5 indicates time t. The printing data look-ahead unit 71 of the thermal heat transfer printer 10 specifies a location where the printing data is present by looking ahead the printing data before actual printing is performed. In addition, in FIG. 5, shaded areas indicate areas where the printing data is present. Meanwhile, the unshaded areas indicate areas where the printing data is not present.

In a point Q, the printing data look-ahead unit 71 detects that the printing data is present throughout a section Wa. That is, it is assumed that a time difference Da is present between the position where the look-ahead is performed and the actual position of the printing paper 12. In addition, in a point U, the printing data look-ahead unit 71 detects that the printing data is present throughout a section Wb. The printing data look-ahead unit 71 stores the detected information as the look-ahead data 56 (see FIG. 3) in the storage unit 55. Also, the head position control unit 72 calculates back from the conveyance speed of the printing paper 12 with reference to the stored look-ahead data 56 and calculates a timing of lowering the thermal head 23 and a timing of raising the thermal head 23.

The head position control unit 72 lowers the thermal head 23 immediately before time t2 if the position corresponding to the point Q of the printing paper 12 reaches the thermal head 23, that is, at time t1 corresponding to a point R. Accordingly, by bringing the thermal head 23, the ink ribbon 22, and the printing paper 12 in contact with each other, a printable state is obtained.

At this point, at the point Q (t=0), the head position control unit 72 activates the head down timer in an amount corresponding to a time difference Dc from time 0 to the time t1 and lowers the thermal head 23 at the point R (t=t1). The timing of lowering the thermal head 23 is set to a position before a predetermined distance from the position where the actual printing starts, that is, a position before a time difference Db illustrated in FIG. 5.

If the thermal head 23 is lowered, the printing control unit 73 rotationally drives the driving motor 16 to convey the printing paper 12 by the platen roller 15. In addition, the printing control unit 73 rotationally drives the driving motor 25 to wind the ink ribbon 22 around the winding axis 24.

Also, if a section in which the printing data is not present continues throughout a time difference Dd at time t4 corresponding to a point S, the head position control unit 72 activates the head up timer of the amount corresponding to a time difference Df from the time t4 to time t6 at the point S (t=t4), the thermal head 23 is raised at a point T (t=t6). Accordingly, the thermal head 23, the ink ribbon 22, and the printing paper 12 are in the non-contact state and in a state in which only the printing paper 12 is conveyed without performing printing. In addition, the timing of raising the thermal head 23 is set to a position after a predetermined distance from the position where the actual printing is completed, that is after a time difference De illustrated in FIG. 5.

If the thermal head 23 is raised, the printing control unit 73 stops the driving motor 25 and stops the winding of the ink ribbon 22 by the winding axis 24. In addition, the printing control unit 73 rotationally drives the driving motor 14 to continue conveyance of the printing paper 12 by the conveyance rollers 13.

In addition, if it is detected that the printing data is present at time t7 corresponding to the point U, the head position control unit 72 activates a head down timer of the amount corresponding to the time difference Dc from the time t7 to time t8 at the point U (t=t7) and lowers the thermal head 23 at a point V (t=t8). The timing of lowering the thermal head 23 is set to a position before a predetermined distance from the position where the actual printing starts, that is the position before the time difference Db illustrated in FIG. 5.

Thereafter, the head position control unit 72 activates the head down timer and the head up timer at any time based on the look-ahead result by the printing data look-ahead unit 71 and control the raising and lowering of the thermal head 23.

Display Example of Saved Amount of Ink Ribbon

Figure 6:
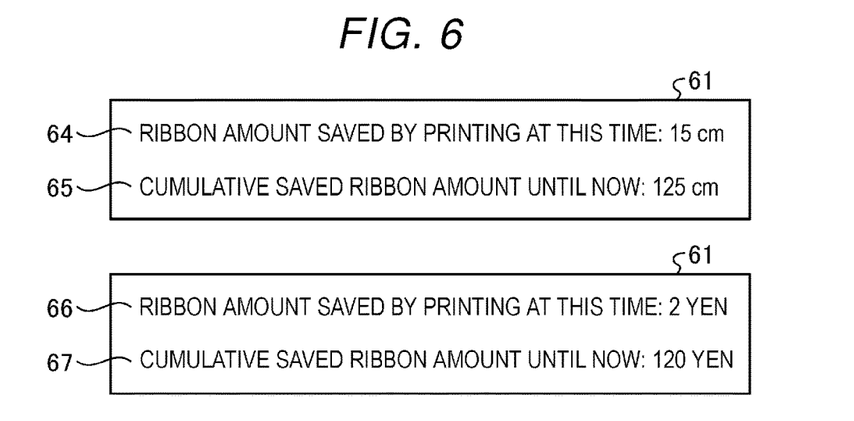
FIG. 6 is a diagram illustrating an example of a saved amount of an ink ribbon which is displayed by the thermal heat transfer printer.

By using FIG. 6, a display example of the saved amount of the ink ribbon 22 is described. FIG. 6 is a diagram illustrating an example of the saved amount of the ink ribbon 22, which the thermal heat transfer printer 10 displays.

The ink ribbon saved amount display unit 75 of the thermal heat transfer printer 10 displays the saved amount of the ink ribbon 22 illustrated in FIG. 6, on the display device 61.

Specifically, the ink ribbon saved amount display unit 75 displays a saved amount 64 of the ink ribbon 22 and a cumulative saved amount 65 of the ink ribbon 22, which are illustrated in FIG. 6.

The saved amount 64 indicates the length of the ink ribbon 22 that can be saved by a printing operation at this time.

The cumulative saved amount 65 indicates a cumulative length of the saved amounts of the ink ribbon 22 after the ink ribbon 22 (the ribbon roll 21) is replaced.

In addition, as illustrated in FIG. 6, the ink ribbon saved amount display unit 75 may display a saved amount 66 of the ink ribbon 22 and a cumulative saved amount 67 of the ink ribbon 22.

The saved amount 66 indicates a price obtained by converting the length of the ink ribbon 22 that can be saved by the printing operation at this time into the cost of the ink ribbon 22.

The cumulative saved amount 67 indicates a price obtained by converting the cumulative length of the saved amounts of the ink ribbon 22 after the ink ribbon 22 (the ribbon roll 21) is replaced, into the cost of the ink ribbon 22.

Flow of Process Performed by Thermal Heat Transfer Printer

Figure 7:
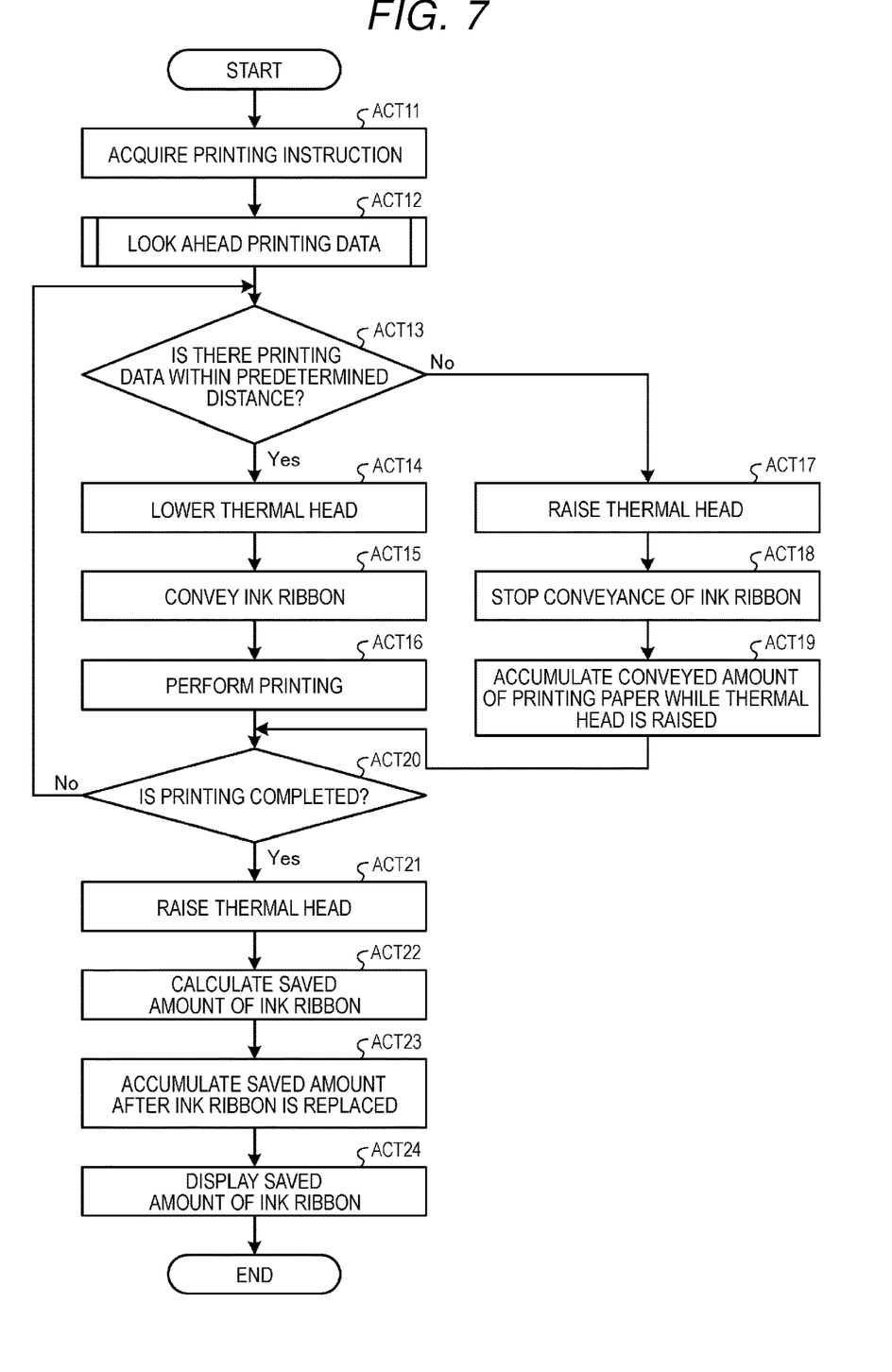
FIG. 7 is a diagram illustrating an example of a flow of a process performed by the thermal heat transfer printer.

By using FIG. 7, a flow of a process performed by the thermal heat transfer printer 10 is described. FIG. 7 is a diagram illustrating an example of the flow of the process performed by the thermal heat transfer printer 10.

The printing control unit 73 acquires a printing instruction (ACT 11).

The printing data look-ahead unit 71 performs a look-ahead process of the printing data (ACT 12). The look-ahead process of the printing data is performed, for example, by the method described above (see FIG. 5).

The head position control unit 72 refers to the look-ahead result of the printing data and determines whether there is printing data within a predetermined distance (ACT 13). If it is determined that there is printing data within the predetermined distance (ACT 13: Yes), the process proceeds to ACT 14. Meanwhile, if it is not determined that there is printing data within the predetermined distance (ACT 13: No), the process proceeds to ACT 17.

In ACT 13, if it is determined that there is printing data within the predetermined distance, the head position control unit 72 lowers the thermal head 23 (ACT 14).

The printing control unit 73 causes the ink ribbon 22 to be in the conveyed state (ACT 15).

The printing control unit 73 performs printing (ACT 16). Thereafter, the process proceeds to ACT 20.

Meanwhile, in ACT 13, if it is not determined that there is printing data within the predetermined distance, the head position control unit 72 raises the thermal head 23 (ACT 17).

The printing control unit 73 stops the conveyance of the ink ribbon 22 (ACT 18).

The ink ribbon saved amount calculation unit 74 accumulates the conveyed amount of the printing paper 12 while the thermal head 23 is raised (ACT 19). The conveyed amount of the printing paper 12 can be calculated, for example, by a period of time if the thermal head 23 is raised and the number of times of rotations of the conveyance rollers 13 during the period of time.

The printing control unit 73 determines whether the printing is completed (ACT 20). If it is determined that the printing is completed (ACT 20: Yes), the process proceeds to ACT 21. Meanwhile, if it is not determined that the printing is completed (ACT 20: No), the process returns to ACT 13.

In ACT 20, if it is determined that the printing is completed, the printing control unit 73 raises the thermal head 23 (ACT 21). Here, the reason why the thermal head 23 is raised is to prevent the ink of the ink ribbon 22 warmed by the thermal head 23 from being solidified by bringing the thermal head 23, the ink ribbon 22, and the printing paper 12 in contact with each other for a long period of time and to prevent the thermal head 23, the ink ribbon 22, and the printing paper 12 from sticking to each other.

The ink ribbon saved amount calculation unit 74 calculates the saved amount of the ink ribbon 22 (ACT 22).

The ink ribbon saved amount calculation unit 74 accumulates the saved amount of the ink ribbon 22 after the ink ribbon 22 (the ribbon roll 21) is replaced (ACT 23).

The ink ribbon saved amount display unit 75 displays the saved amount of the ink ribbon 22 on the display device 61 (ACT 24). Thereafter, the thermal heat transfer printer 10 completes the process of FIG. 7.

In addition, though not illustrated in FIG. 7, the conveyed amounts of the printing paper 12 accumulated in ACT 19 are reset at the timing if it is determined that the printing is completed in ACT 20. In addition, the cumulative value of the saved amounts of the ink ribbon 22 is reset if the ink ribbon 22 (the ribbon roll 21) is replaced. In addition, the cumulative value of the saved amounts of the ink ribbon 22 may be reset if a remaining amount sensor (not illustrated in FIG. 1) that detects the remaining amount of the ink ribbon 22 detects that the remaining amount of the ink ribbon 22 is less than a predetermined value.

Action Effect of Embodiment

As described above, the thermal heat transfer printer 10 (printer device) according to the embodiment includes the printing data look-ahead unit 71 that looks ahead the data printing position if the printing is performed, the head position control unit 72 that causes the thermal head 23, the ink ribbon 22, and the printing paper 12 to be in the contact state or the non-contact state based on the look-ahead result of the printing data look-ahead unit 71, the ink ribbon saved amount calculation unit 74 that calculates the saved amount of the ink ribbon 22 based on the conveyed amount of the printing paper 12 in the non-contact state, and the ink ribbon saved amount display unit 75 that displays the saved amount calculated by the ink ribbon saved amount calculation unit 74. Accordingly, the user can confirm the saved amount of the ink ribbon 22.

In addition, in the thermal heat transfer printer 10 (printer device) according to the embodiment, the head position control unit 72 causes the thermal head 23, the ink ribbon 22, and the printing paper 12 to be in the non-contact state in a condition that a distance between the thermal head 23 and the data printing position is equal to or more than a predetermined value and causes the thermal head 23, the ink ribbon 22, and the printing paper 12 to be in the contact state in a condition that the distance between the thermal head 23 and the data printing position is less than a predetermined value, based on the look-ahead result of the printing data look-ahead unit 71. Accordingly, the timing of raising and lowering the thermal head 23 can be securely and easily determined.

In addition, in the thermal heat transfer printer 10 (printer device) according to the embodiment, the ink ribbon saved amount display unit 75 displays the saved amount of the ink ribbon 22 if the printing is completed. Therefore, whenever the printing is completed, the saved amount of the ink ribbon 22 can be confirmed.

In addition, in the thermal heat transfer printer 10 (printer device) according to the embodiment, the ink ribbon saved amount display unit 75 further displays the cumulative value of the saved amount of the ink ribbon 22 since the ink ribbon 22 (the ribbon roll 21) is replaced. Therefore, it is possible to confirm not only the saved amount of the ink ribbon 22 in the printing at this time but also the saved amount of the ink ribbon 22 since the ribbon roll 21 is replaced.

In addition, in the thermal heat transfer printer 10 (printer device) according to the embodiment, the cumulative value of saved amounts of the ink ribbon 22 is reset if the wound amount of the ink ribbon 22 reaches the predetermined value or if the ink ribbon 22 (the ribbon roll 21) is replaced. Therefore, the saved amount of the ink ribbon 22 can be reset without performing a special operation, and thus it is possible to prevent forgetting to reset.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer device, comprising:
   a printing data look-ahead component configured to look ahead a data printing position if printing is performed;
   a head position controller configured to cause a thermal head, an ink ribbon, and printing paper to be in a contact state or a non-contact state based on a look-ahead result of the printing data look-ahead component;
   an ink ribbon saved amount calculation component configured to calculate a saved amount of the ink ribbon based on a conveyed amount of the printing paper in the non-contact state and a cumulative value of the saved amount of the ink ribbon since the ink ribbon was last replaced; and
   an ink ribbon saved amount display configured to display the saved amount calculated by the ink ribbon saved amount calculation component and the cumulative value of the saved amount of the ink ribbon since the ink ribbon was last replaced.

2. The printer device according to claim 1, wherein
   based on the look-ahead result of the printing data look-ahead component, the head position controller causes the thermal head, the ink ribbon, and the printing paper to be in the non-contact state, in a condition that a distance between the thermal head and the data printing position is equal to or greater than a predetermined value, and
   the head position controller causes the thermal head, the ink ribbon, and the printing paper to be in the contact state in a condition that the distance between the thermal head and the data printing position is less than a predetermined value.

3. The printer device according to claim 1, wherein
   the ink ribbon saved amount display displays the saved amount of the ink ribbon if printing is completed.

4. The printer device according to claim 1, wherein
   the cumulative value of the saved amount is reset if a wound amount of the ink ribbon reaches a predetermined value or if the ink ribbon is replaced.

5. The printer device according to claim 1, wherein
   the saved amount indicates a price obtained by converting a length of the ink ribbon saved by a printing operation into a cost of the ink ribbon saved.

6. The printer device according to claim 1, wherein
   the ink ribbon saved amount display is a liquid crystal panel or an organic EL panel.

7. The printer device according to claim 1, wherein the printer device comprises a thermal transfer printer device.

8. A print method, comprising:
   looking ahead at a data printing position if printing is performed;
   causing a thermal head, an ink ribbon, and printing paper to be in a contact state or a non-contact state based on a look-ahead result;
   calculating a saved amount of the ink ribbon based on a conveyed amount of the printing paper in the non-contact state and a cumulative value of the saved amount of the ink ribbon since the ink ribbon was last replaced; and
   displaying the saved amount calculated and the cumulative value of the saved amount of the ink ribbon since the ink ribbon was last replaced.

9. The print method according to claim 8, further comprising:
   based on the look-ahead result, causing the thermal head, the ink ribbon, and the printing paper to be in the non-contact state, in a condition that a distance between the thermal head and the data printing position is equal to or greater than a predetermined value; and
   causing the thermal head, the ink ribbon, and the printing paper to be in the contact state in a condition that the distance between the thermal head and the data printing position is less than a predetermined value.

10. The print method according to claim 8, further comprising:
    displaying the saved amount of the ink ribbon if printing is completed.

11. The print method according to claim 8, further comprising:
    resetting the cumulative value of the saved amount if a wound amount of the ink ribbon reaches a predetermined value or if the ink ribbon is replaced.

12. The print method according to claim 8, wherein
    the saved amount indicates a price obtained by converting a length of the ink ribbon saved by a printing operation into a cost of the ink ribbon saved.

13. The print method according to claim 8, wherein the saved amount calculated and the cumulative value of the saved amount of the ink ribbon since the ink ribbon was last replaced are displayed on a liquid crystal panel or an organic EL panel.

14. A thermal printer device, comprising:
    a printing data look-ahead component configured to look ahead a data printing position if thermal printing is performed;
    a thermal head position controller configured to cause a thermal head, an ink ribbon, and printing paper to be in a contact state or a non-contact state based on a look-ahead result of the printing data look-ahead component;
    an ink ribbon saved amount calculation component configured to calculate a saved amount of the ink ribbon based on a conveyed amount of the printing paper in the non-contact state and cumulative value of the saved amount of the ink ribbon since the ink ribbon was last replaced; and
    an ink ribbon saved amount display configured to display the saved amount calculated by the ink ribbon saved amount calculation component and the cumulative value of the saved amount of the ink ribbon since the ink ribbon was last replaced.

15. The thermal printer device according to claim 14, wherein
    based on the look-ahead result of the printing data look-ahead component, the thermal head position controller causes the thermal head, the ink ribbon, and the printing paper to be in the non-contact state, in a condition that a distance between the thermal head and the data printing position is equal to or greater than a predetermined value, and
    the thermal head position controller causes the thermal head, the ink ribbon, and the printing paper to be in the contact state in a condition that the distance between the thermal head and the data printing position is less than a predetermined value.

16. The thermal printer device according to claim 14, wherein
    the ink ribbon saved amount display displays the saved amount of the ink ribbon if thermal printing is completed.

17. The thermal printer device according to claim 14, wherein
   the cumulative value of the saved amount is reset if a wound amount of the ink ribbon reaches a predetermined value or if the ink ribbon is replaced.

18. The thermal printer device according to claim 14, wherein
   the saved amount indicates a price obtained by converting a length of the ink ribbon saved by a thermal printing operation into a cost of the ink ribbon saved.

19. The thermal printer device according to claim 14, wherein
   the ink ribbon saved amount display is a liquid crystal panel or an organic EL panel.

20. The thermal printer device according to claim 14, wherein the thermal printer device comprises a thermal transfer printer device.

\* \* \* \* \*